United States Patent
Luo et al.

(10) Patent No.: US 7,899,229 B2
(45) Date of Patent: Mar. 1, 2011

(54) METHOD FOR DETECTING ANATOMICAL MOTION BLUR IN DIAGNOSTIC IMAGES

(76) Inventors: Hui Luo, Rochester, NY (US); William J. Sehnert, Fairport, NY (US); Jacquelyn S. Ellinwood, Rochester, NY (US)

( * ) Notice: Subject to any disclaimer, the term of this patent is extended or adjusted under 35 U.S.C. 154(b) by 876 days.

(21) Appl. No.: 11/834,304

(22) Filed: Aug. 6, 2007

(65) Prior Publication Data

US 2009/0041305 A1 Feb. 12, 2009

(51) Int. Cl.
 *G06K 9/00* (2006.01)
 *H05G 1/66* (2006.01)
(52) U.S. Cl. .................... 382/128; 382/255; 378/94
(58) Field of Classification Search ............... 382/128, 382/129, 130, 131, 132, 133, 134, 168, 181, 382/199, 221, 232, 255, 256, 266, 274, 275, 382/276, 305, 312, 254; 348/208.6, 208.99; 398/188; 378/4, 20, 21, 94
See application file for complete search history.

(56) References Cited

U.S. PATENT DOCUMENTS

| 6,987,530 | B2 * | 1/2006 | McConica | 348/208.6 |
| 7,092,579 | B2 * | 8/2006 | Serrano et al. | 382/254 |
| 7,181,082 | B2 * | 2/2007 | Feng | 382/255 |
| 2005/0231603 | A1 * | 10/2005 | Poon | 348/208.99 |
| 2006/0110168 | A1 * | 5/2006 | Kim et al. | 398/188 |

* cited by examiner

Primary Examiner—Seyed Azarian (57) ABSTRACT

A method for detecting one or more motion effects in a diagnostic image obtains image data for the diagnostic image and identifies at least one region of interest in the diagnostic image. The probability of motion blur within the at least one region of interest is calculated according to a motion-sensitive feature of the at least one region of interest. The calculated probability for motion blur within the at least one region of interest is reported.

26 Claims, 7 Drawing Sheets

*Gaussian profile:*

$$Gaus(x,\sigma) = \frac{1}{\sqrt{2\pi\sigma^2}} \cdot exp\left(-x^2 \Big/ 2\cdot\sigma^2\right)$$

FIG. 4A

*Difference of Gaussian (DOG) profile:*

$$DOG(x,\sigma_1,\sigma_2) = Gaus(x,\sigma_1) - Gaus(x,\sigma_2)$$

METHOD FOR DETECTING ANATOMICAL MOTION BLUR IN DIAGNOSTIC IMAGES

FIELD OF THE INVENTION

The invention relates generally to techniques for processing medical images and in particular to techniques for automatically detecting and reporting anatomical motion blur in diagnostic images.

BACKGROUND OF THE INVENTION

In the radiographic diagnostic process, anatomical motion blur is a frequently cited reason for image rejection, due to the loss of image detail and sharpness induced by motion. There are two common sources of anatomical motion blur in medical radiographs. One source is patient movement during the image capture, that is, external motion. The result of external motion is blurred appearance of an entire anatomical region in the image. A second source relates to internal motion due to the normal involuntary functioning of anatomy. For example, the beating of the heart can cause some amount of blur either directly, if the heart tissue lies within the image, or indirectly, by the compensating movement of surrounding structures. This effect can result in blur within local regions of a chest radiograph.

Motion blur due to camera shaking and inadvertent motion of the subject has been a recognized problem in photography. There have been a number of solutions proposed for reducing image blur in photographs.

U.S. Pat. No. 7,181,082 B2 (Feng), entitled "Blur Detection System" describes a system of estimating and reducing image blur using a sequence of discrete cosine transform (DCT) coefficients arranged in a plurality of blocks on digital images.

U.S. Patent Application No. US 2005/0231603 (Poon), entitled "Motion Blur Correction" discloses a method of correcting blur in a motion image by estimating the direction and extent of blur based on edge response of the motion-blurred image over a set of directions, computing an error image between the actual motion-blurred image and a "guess image" generated by the estimated blur function, and then finally correcting the image blur using the error image.

U.S. Pat. No. 6,987,530 B2 (McConica), entitled "Method for Reducing Motion Blur in a Digital Image" relates to a method for detecting and reducing motion blur that includes calculation of first and second figures of merit associated with two substantially orthogonal directions and comparison of the figures of merit and adjustment of magnitude of the amplitude of spatial frequencies of the image in response to the comparison.

While these references relate to systems/methods to compensate for motion blur for digital photography, such systems/methods are not appropriate for diagnostic imaging. There are significant differences between photographic and diagnostic images, and differences in how the sensing apparatus responds to motion during image capture. The sources of blur motion themselves also differ significantly between photographic and diagnostic imaging systems. In photographic images, motion blur typically originates from external sources, such as object movement, camera shake or focus errors. Blur compensation (such as using, for example, a de-blur kernel) may be desirable for photographic images; however, this type of solution can be undesirable for diagnostic images, as it may unintentionally alter image contents and introduce artifacts or mask problems. For such reasons, conventional approaches to image blur that might be useful in photographic imaging can have little or no relevance for diagnostic imaging.

Accordingly, there exists a need for a method that detects and reports anatomical motion blur resulting from either external or internal motion in radiographic medical image data.

SUMMARY OF THE INVENTION

It is an object of the present invention to address motion blur in diagnostic imaging. According to one aspect, the present invention provides a method for detecting one or more motion effects in a diagnostic image comprising: a) obtaining image data for the diagnostic image; b) identifying at least one region of interest in the diagnostic image; c) calculating the probability of motion blur within the at least one region of interest, according to a motion-sensitive feature of the at least one region of interest; and d) reporting the calculated probability for motion blur within the at least one region of interest.

An advantage of the present invention that it provides methods for detecting as well as reporting portions of the diagnostic image that may be subject to image blur as well as detecting and reporting where a diagnostic image or portion of a diagnostic image may not be subject to image blur.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

The following is a detailed description of embodiments of the invention, reference being made to the drawings in which the same reference numerals identify the same elements of structure in each of the several figures.

The present invention can be used for imaging systems that obtain diagnostic digital image data from a radiographic receiver or other type of image source. This includes imaging systems that scan and use images obtained from an analog x-ray film image, as well as apparatus such as Computed Radiography (CR) and Digital Radiography (DR) systems. Using systems such as these that obtain digital image data in some manner, embodiments of the present invention are directed to a method for automatically detecting anatomical motion blur in the obtained diagnostic images.

For the purpose of describing the invention, the details given in the present disclosure use human chest or thoracic x-ray imaging as one illustrative example. However, it can be appreciated that the principles and methods described here with reference to chest imaging can be similarly applied for images of other types, as well as for imaging other anatomical regions of interest.

Figure 1:
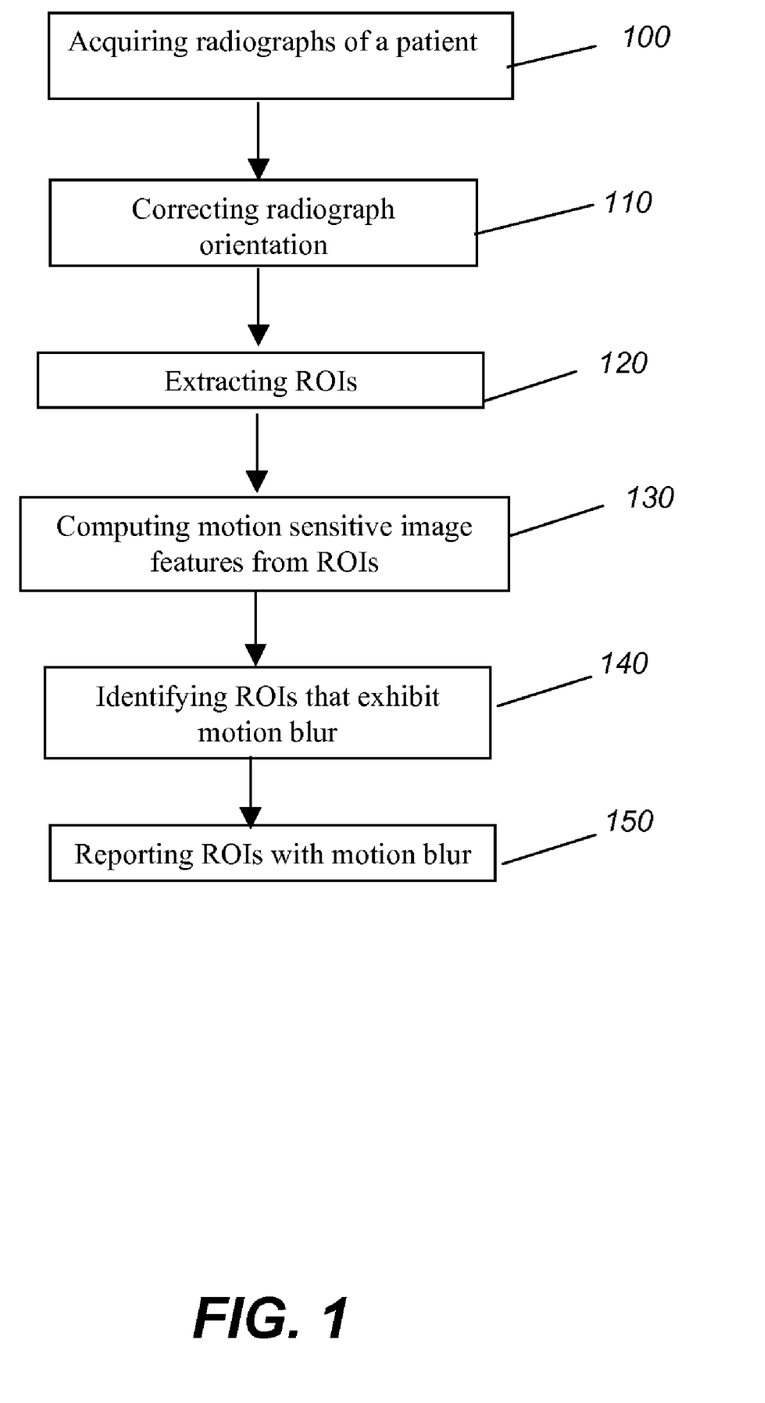
FIG. 1 is a logic flow diagram illustrating an automated method for detecting motion blur in an image.

FIG. 1 shows an overall logic flow that can be used for the automated method of embodiments of the present invention. It shows an image acquisition step 100, a radiograph orientation correction step 110, a region location step 120, a computing motion step 130, an ROI identification step 140, and a reporting step 150.

In image acquisition step 100, the radiographic image is obtained in digital form. The image can be obtained directly from a digital image receiver, such as those used for CR or DR imaging. Optionally, the image can be obtained from a Picture Archiving and Communication System (PACS) or other networked source for radiographic images, or can be digitized from an existing film radiograph.

Proper positional orientation of the anatomical region of interest with respect to the digital receiver promotes obtaining accurate diagnostic assessment of the image and is desirable for further processing of image data. Continuing with the logic flow of FIG. 1, an orientation step 110 is carried out next to organize the image data so that it represents the image content with a given, predetermined arrangement. This step can be accomplished by using any of a number of methods known to those skilled in the art. One such automatic method is disclosed in commonly assigned U.S. Patent Application No. 2006/0110168, Ser. No. 10/993,055 filed on Nov. 19, 2004 by Luo et al. entitled "DETECTION AND CORRECTION METHOD FOR RADIOGRAPHY ORIENTATION" and incorporated herein by reference.

With the image oriented to the predetermined orientation, a region location step 120 is implemented. In this step, a template or set with one or more predefined regions of interest (ROI) is applied to the image to identify and extract areas of the image to be assessed for motion blur. According to at least one embodiment of the present invention, the assignment of ROIs meets one requirement: that all ROIs are located within the anatomy region. Otherwise, the extracted features from the ROIs may not represent the characteristics of patient motion. The location of ROIs could be arbitrarily distributed in the anatomy region, or may be assigned based on given guidelines, generally associated with the anatomy or body part in the image.

Figure 2:
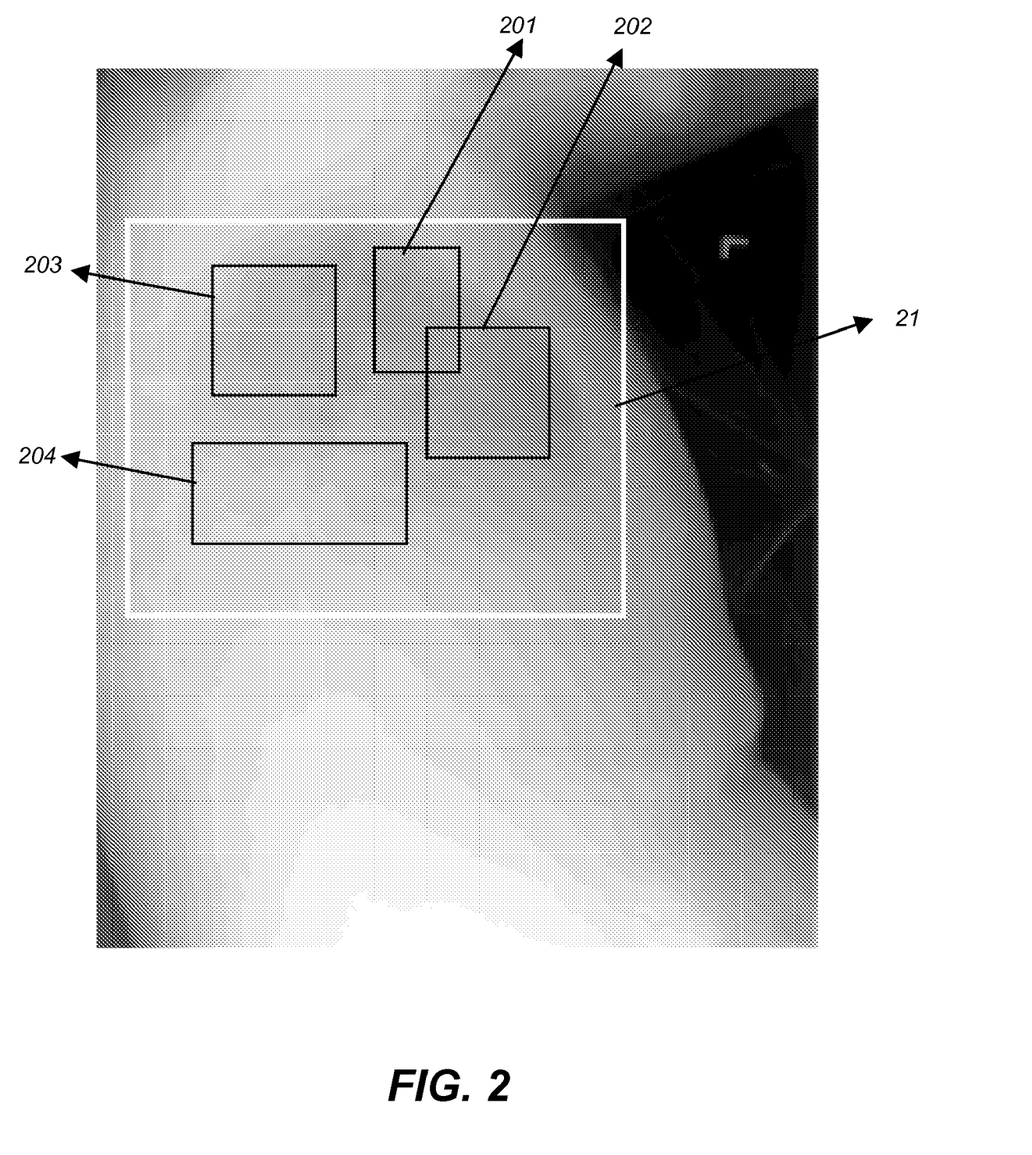
FIG. 2 shows the extraction of ROIs in a chest radiographic image with a lateral projection.

To show this by way of example, FIG. 2 illustrates locating ROIs in a conventional chest radiographic image taken with lateral projection view. In this example, a number of specific ROIs (201, 202, 203, 204), each shown as a rectangular area, are located around the lung region 21. For this type of image, this is where motion blur is likely to occur and where the radiologists' primary interest and interpretation is focused. In one embodiment of the present invention, an ROI detection guideline is stored in memory in the system for each body part, in order to direct the search of ROIs for images of the associated body part. This forms a type of "template" that can then be stored and referenced for performing blur detection. Such a template is adaptable to fit the individual image. For example, a template element can be automatically scaled in order to adjust to patient size and can be rotated to align with the patient's orientation.

Another method for identifying and extracting ROIs is based on motion blur-sensitive features. This method initially assigns a set of pixels as "seeds" equally distributed throughout the anatomy region in the image. Then, an ROI grows outward from each seed by evaluating statistical values of the corresponding nearby features. The growth of an ROI continues as long as a predetermined requirement is met. In one embodiment, for example, ROI growth continues according to the change of statistics of the features relative to a predefined threshold. For example, the pixel value I(x,y) could be a feature. If the average pixel value of ROI $I_{avg}$ is less than the predefined threshold $I_{th}$, the ROI will stop growing.

Figure 3:
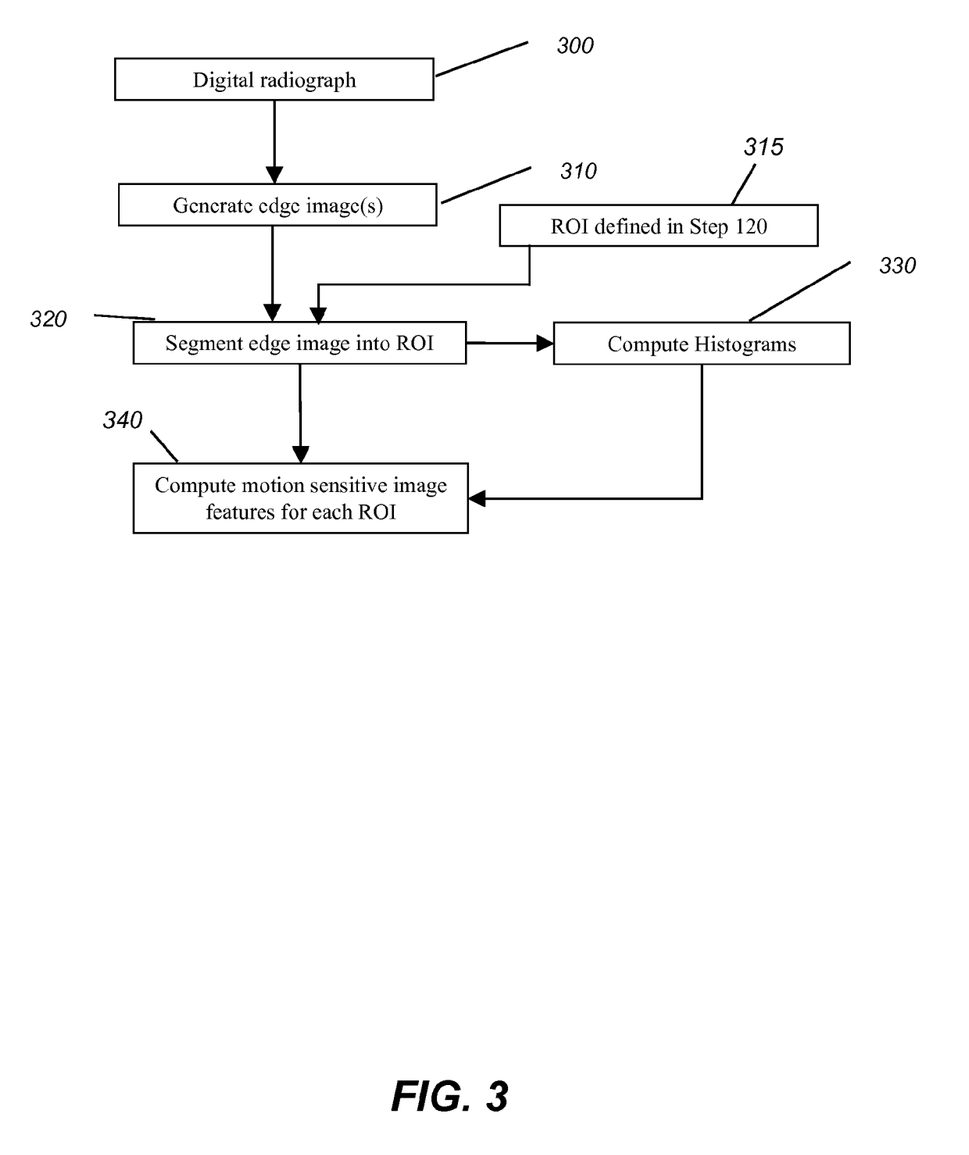
FIG. 3 is a logic flow diagram for calculating motion sensitive image features.
Figure 4A:
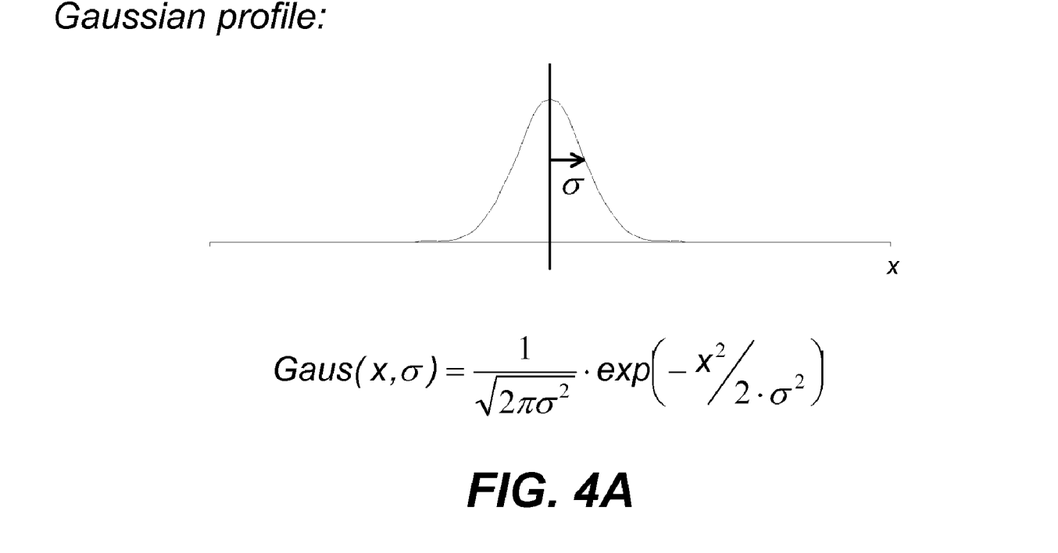
FIGS. 4A and 4B are graphs that show a Gaussian equation and profile and Difference of Gaussian equation and profile that can be used in calculating motion sensitive image features.
Figure 4B:
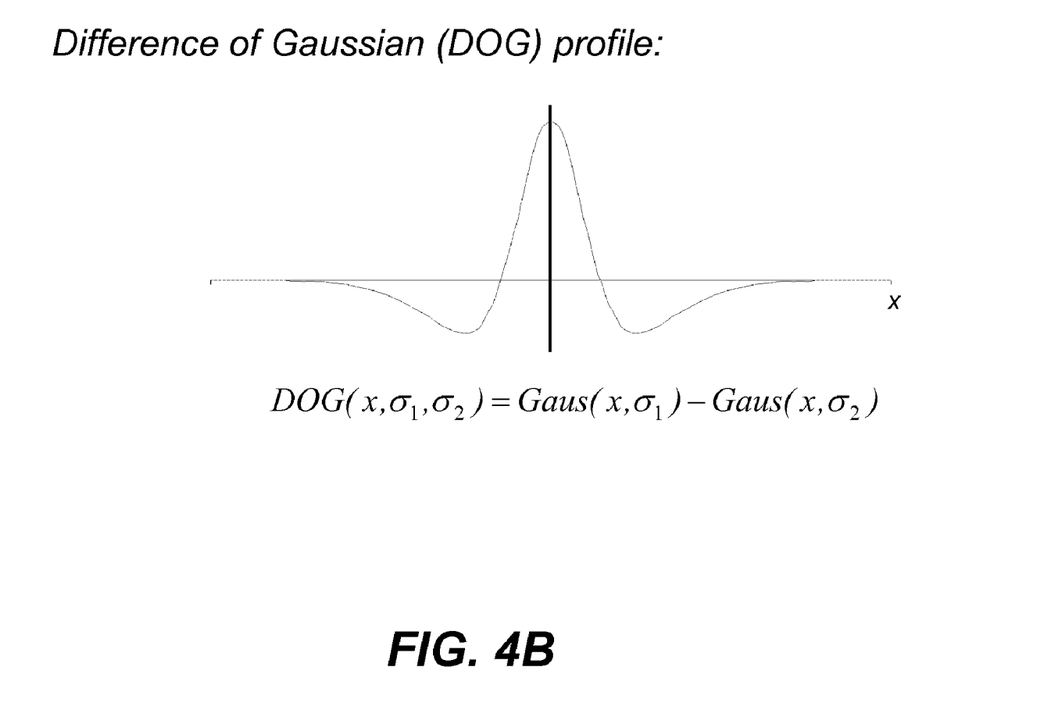

Referring back to the logic flow diagram of FIG. 1, computing motion step 130 is executed. A set of motion-sensitive features is calculated from one or more edge images for each ROI defined in step 120. FIG. 3 shows a logic flow diagram for calculating these features. After the digital radiograph is acquired in an obtain radiograph step 300, one or more edge images are calculated in an edge generation step 3 10. According to embodiments of the present invention, two edge images are computed to accentuate the horizontal edges and the vertical edges independently. The horizontal edge image is calculated by convolving each row of pixels in the digital radiograph with a one-dimensional band-pass filter. In one embodiment, the kernel of the band-pass filter is taken to be the difference of two distinct Gaussian profiles, as shown in FIG. 4B. To reduce the level of noise introduced by the band-pass convolution, an optional smoothing filter may then be applied to the result. To minimize an adverse impact to the accentuated edges, a preferred method of smoothing is to convolve each column of pixels with a one-dimensional low-pass filter. In a preferred embodiment, the kernel of this low-pass filter would have a Gaussian profile, whose general shape is depicted in FIG. 4A. Mathematically, the resulting horizontal edge image $E_H$ is described by the discrete convolution formula:

$$E_H(n, m) = \sum_{j=0}^{N} \sum_{k=0}^{M} Gaus(m - k, \sigma_0^H) \cdot DOG(n - j, \sigma_1^H, \sigma_2^H) \cdot I(j, k)$$

where I(n,m) represents the original N×M image pixel matrix and the one-dimensional functions $Gaus(x,\sigma_0)$ and $DOG(x, \sigma_1,\sigma_2,)$, superscripted $^H$ for horizontal values, are defined by the following formulas:

$$Gaus(x, \sigma_0) = \frac{1}{\sqrt{2\pi\sigma_0^2}} \cdot \exp\left(-\frac{x^2}{2 \cdot \sigma_0^2}\right)$$

$$DOG(x, \sigma_1, \sigma_2) = Gaus(x, \sigma_1) - Gaus(x, \sigma_2), \sigma_1 < \sigma_2$$

Similarly, a vertical edge image $E_V$ is constructed according to the discrete convolution formula:

$$E_V(n, m) = \sum_{j=0}^{N} \sum_{k=0}^{M} Gaus(n - j, \sigma_0^V) \cdot DOG(m - k, \sigma_1^V, \sigma_2^V) \cdot I(j, k)$$

In addition to these horizontal and vertical edge images, other edge images could be considered as well. For example, edge images oriented along the 45-degree diagonals, instead of along the primary axes, would be natural selections complementing the edge images $E_H$ and $E_V$ defined above. Edge images can be taken along any predetermined direction or axis.

Using the ROI defined in region location step 120 (FIG. 1) or from some other source, a segmentation step 320 (FIG. 3) segments edge images of interest to form separate ROIs. Then, in a computation step 340, a number of motion-sensitive features are calculated from each edge image generated in step 310 for each of the ROIs previously defined, shown as 315. These features are later used to assess the possibility of motion or degree of motion within the given ROI. To simplify the description of features, the edge images are enumerated as $E_j$, $j=1, 2, \ldots, J$. $N_{ROI}$ represents the number of pixels within the ROI; $H^j_{ROI}(x)$ denotes the histogram of pixel values $x$ from edge image $E_j$ restricted to the given ROI. The histogram is generated in a histogram step 330 as:

$$H^j_{ROI}(x) = \sum_{(n,m)\in ROI} \delta_{Kr}(E_j(n,m) - x),$$

where $\delta_{Kr}$ denotes the Kronecker delta function:

$$\delta_{Kr}(x) = \begin{cases} 0, & x \neq 0 \\ 1, & x = 0. \end{cases}$$

Further, Edge_Min and Edge_Max denote, respectively, the minimum and maximum pixel values occurring within any of the computed edge images. The features, described in detail below, are enumerated as $F^q_{ROI,Ej}$, $q=1, 2, \ldots, 7$, with the subscript $(ROI, E_j)$ indicating that the feature was computed from edge image $E_j$ within the given ROI.

The first two features $F^1_{ROI,Ej}$ and $F^2_{ROI,Ej}$ provide a measure of the mean local variation:

$$F^1_{ROI,Ej} = \sqrt{\frac{1}{N_{ROI}} \cdot \sum_{(n,m)\in ROI}(E_j(n+1,m) - E_j(n,m))^2}$$

$$F^2_{ROI,Ej} = \sqrt{\frac{1}{N_{ROI}} \cdot \sum_{(n,m)\in ROI}(E_j(n,m+1) - E_j(n,m))^2}$$

Values of these two features tend to decrease as the local pixel correlation increases, which is the case for an image that exhibits motion-blur.

The next two features $F^3_{ROI,Ej}$ and $F^4_{ROI,Ej}$ yield statistical measures of the variation of edge values within the ROI and are calculated using the edge histogram:

$$F^3_{ROI,Ej} = \sqrt{\frac{1}{N_{ROI}} \cdot \sum_{c=Edge\_Min}^{Edge\_Max} H^j_{ROI}(c) \cdot (c - \overline{E^{ROI}_j})^2}$$

$$F^4_{ROI,Ej} = \frac{\sqrt{\pi}}{\sqrt{2} \cdot N_{ROI}} \cdot \sum_{c=Edge\_Min}^{Edge\_Max} H^j_{ROI}(c) \cdot |c - \overline{E^{ROI}_j}|$$

where $\overline{E^{ROI}_j}$ is the mean edge pixel value from within the region of interest:

$$\overline{E^{ROI}_j} = \frac{1}{N_{ROI}} \cdot \sum_{c=Edge\_Min}^{Edge\_Max} c \cdot H^j_{ROI}(c).$$

Values of these two features $F^3_{ROI,Ej}$ and $F^4_{ROI,Ej}$ will be substantially identical in regions that exhibit significant motion blur where edge values are diminished and where noise fluctuations become more dominant. It is noted, when significantly strong edges appear in the ROI, the ratio of features $F^3_{ROI,Ej}/F^4_{ROI,Ej}$ begins to increase sharply.

Two additional features are calculated from the tail of the edge histogram generated in step 330. Value $\eta^{ROI}_j$ represents an estimate of the noise level in edge image $E_j$ restricted to the given ROI. One method for estimating this noise level is outlined in commonly assigned U.S. Pat. No. 7,092,579, entitled "Calculating noise estimates of a digital image using gradient analysis" to Serrano et al.

Multiplying the noise level $\eta^{ROI}_j$ by a small scalar $\tau$ and using the product as a histogram threshold yields the following additional features:

$$F^5_{ROI,Ej} = \frac{1}{N_{ROI}} \cdot \sum_{|c|>\tau\cdot\eta^{ROI}_j} H^j_{ROI}(c)$$

$$F^6_{ROI,Ej} = \frac{1}{F^5_{ROI,Ej} \cdot N_{ROI}} \cdot \sum_{|c|>\tau\cdot\eta^{ROI}_j} H^j_{ROI}(c) \cdot |c|$$

Feature value $F^5_{ROI,Ej}$ represents the relative area of pixels exceeding the given multiple, $\tau$, above the base noise level while feature value $F^6_{ROI,Ej}$ provides an estimate of the edge strength or edge magnitude.

Another feature that can be used in embodiments of the present invention is related to the number of zero-crossings in the edge image and within the given ROI. A zero crossing occurs at certain pixel locations within an edge image whenever there is a strong edge transition at that location. To determine if a zero crossing occurs at a particular pixel location $(n,m)$ in edge image $E_j$, the pixel values in the edge image within a 3×3 window centered at the pixel location are examined. Within this window, the minimum and the maximum edge values can be computed, using:

$$\text{Min}_j(n,m) = \min_{\substack{|n-n'|\leq 1 \\ |m-m'|\leq 1}} (E_j(n',m'))$$

$$\text{Max}_j(n,m) = \max_{\substack{|n-n'|\leq 1 \\ |m-m'|\leq 1}} (E_j(n',m'))$$

It can be deduced that there is a zero crossing at pixel location $(n,m)$ if the following conditions are met:

$$\text{Min}_j(n,m) \leq -\tau_Z$$

$$\text{Max}_j(n,m) \geq \tau_Z$$

$$|\text{Max}_j(n,m) - \text{Min}_j(n,m)| \geq \delta_Z$$

Here, $\tau_Z$ is a small positive threshold, typically scaled to the amount of noise in the edge image, serving the purpose of eliminating those zero-crossings due to noise fluctuations. The other parameter, $\delta_Z \geq 2\cdot\tau_Z$, is used to further limit the zero-crossings to only those that result from edges of significant magnitude. Letting $Z^\#_{ROI,Ej}$ denote the number of zero-crossings in edge image $E_j$ occurring in the given ROI, then:

$$F^7_{ROI,Ej} = \frac{Z^\#_{ROI,Ej}}{N_{ROI}}$$

which represents the number of zero-crossings per unit area.

Features $F^1_{ROI,Ej}$ through $F^7_{ROI,Ej}$ can be generated as described herein, combined and processed to form feature vectors or other suitable composite information, and then used to determine the relative likelihood of image blur in each identified ROI. Referring back to FIG. 1, identification of ROIs with motion blur is executed in an identification step 140 to examine the extracted image features in detail. With respect to the example chest radiograph image in FIG. 2, either of two patterns can be identified in the ROIs. A normal pattern indicates no motion blur, and an abnormal pattern has blur characteristics caused by motion of the patient.

Assessment of motion blur can be accomplished using a trained classifier, for example, which is trained to recognize patterns of motion blur. The input of the classifier can include a feature vector or a set of feature vectors computed from the ROIs, as just described. Based on these features, the classifier outputs a probability value that corresponds to its judgment of motion blur status of the ROI. The higher this probability value, the more likely that motion blur occurs in the ROI.

It is noted that embodiments of the present invention are not limited to generation and use of the above features or feature vectors. Suitable features that can be derived from the image or reference features can be used to promote distinguishing a normal region from a region that exhibits motion blur. This can include, for example, texture characteristics obtained from the region of interest. Other methods for detecting motion blur can use characteristics such as entropy from pixel intensity histograms taken for the ROI.

Because motion blur can vary significantly depending on the body part that is imaged, embodiments of the present invention may use trained classifiers specifically designed for each body part or for each view of a body part. For example, a motion blur detection classifier can be trained for lateral view chest radiographs and used for detecting patient motion solely in chest lateral view images. The use of an individual classifier trained in this way can help to prevent ambiguous results and can greatly improve the performance of the method.

Blur effects can be local, confined to only one or two ROIs, or can be more general or global, affecting the full diagnostic image. For an image having multiple ROIs that exhibit blur, the global probability should be derived in order to assess the entire image. In embodiments of the present invention, the global probability can be assessed using a probabilistic framework, such as a Bayesian decision rule, to combine probabilities from multiple ROIs.

Referring back to FIG. 1, the results of a global assessment can be reported in a reporting step 150 in several ways. The probability value and the location of the ROI may be recorded in a database for reporting or educational purposes. In the case of an image containing a high probability of motion, the system may visually present the results in softcopy or hardcopy form. It is noted that determining the value of a high probability can be subjective. The capability may exist within a system performing the assessment to set one or more threshold sensitivities, such as by user or by site. A sensitivity value could be set or adjusted by an operator as a threshold value or as a range of values for example.

Figure 5A:
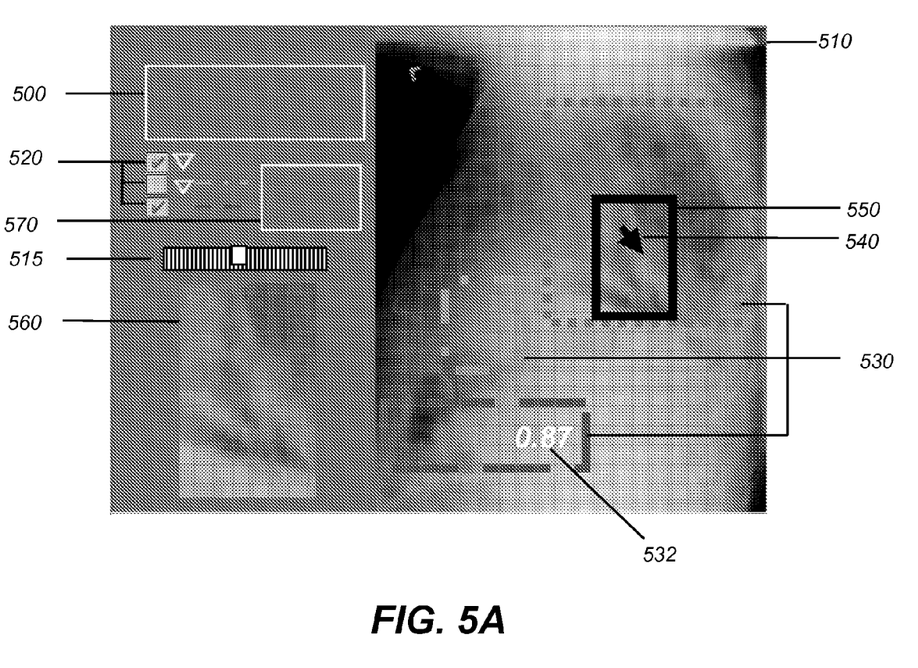
FIGS. 5A, 5B, and 5C show examples of visual presentation from a motion blur detection system.
Figure 5B:
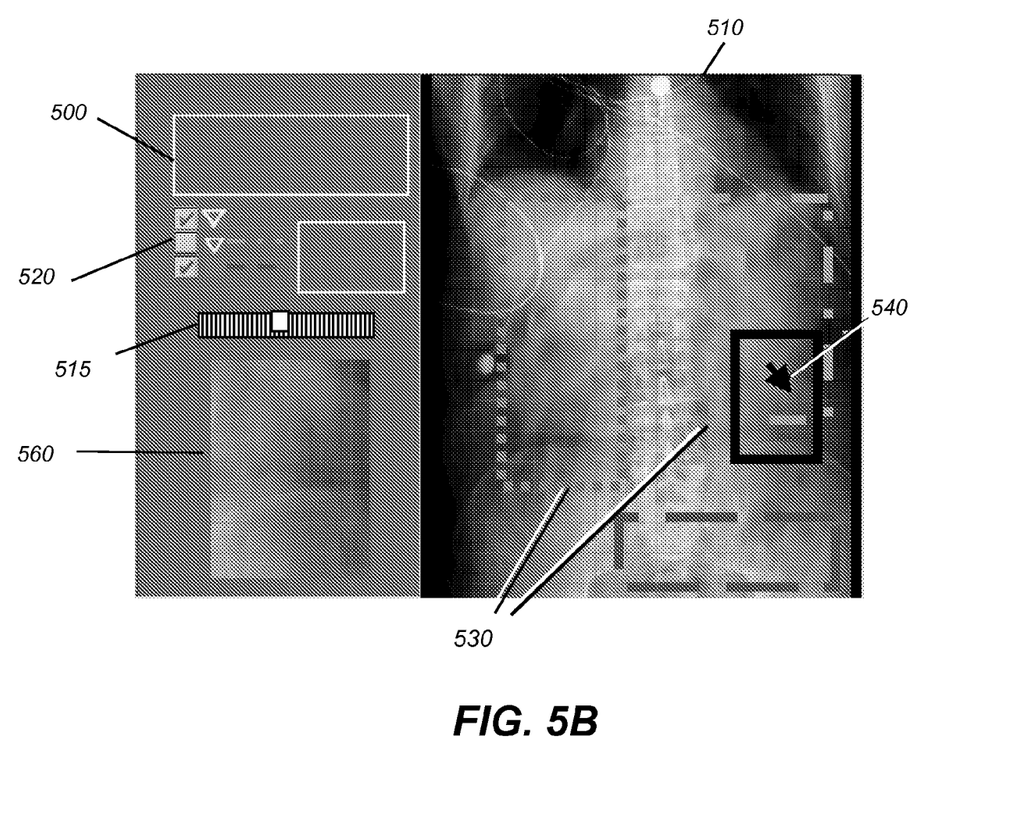
Figure 5C:
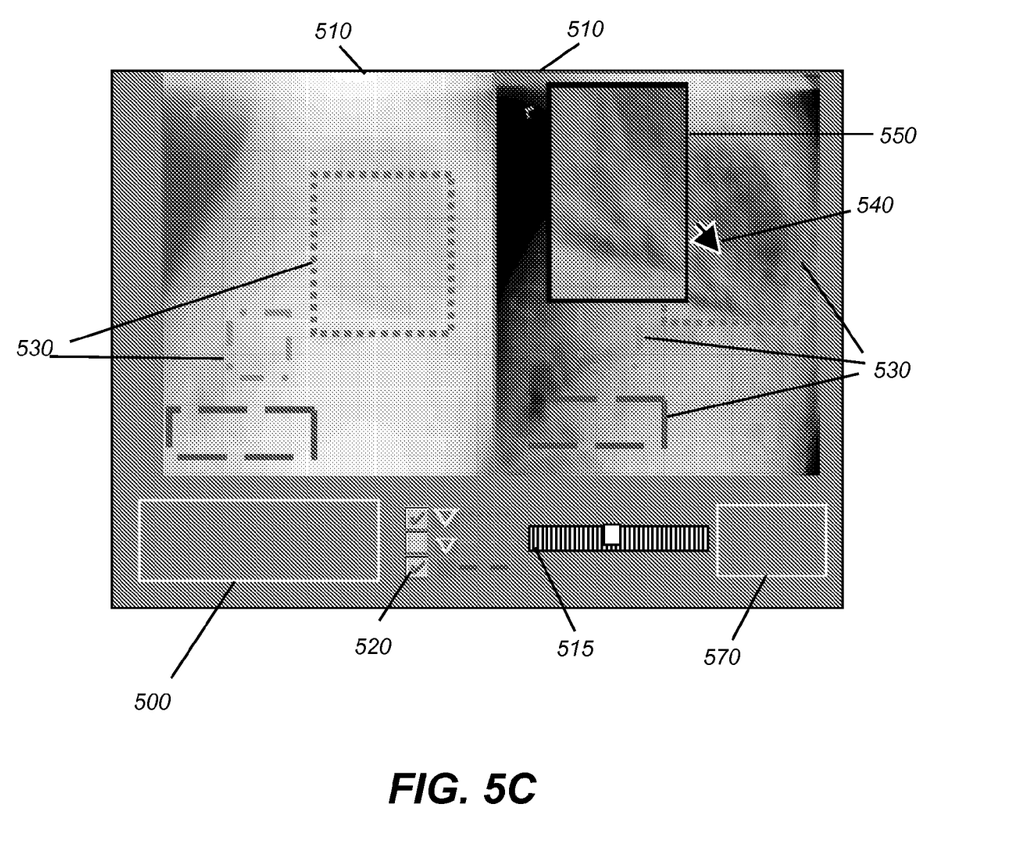

Examples of softcopy visual presentation for an image 510 are shown in FIGS. 5A-5C. One or more data blocks 500 may contain patient data including image identification, patient information, and reason for image examination. Image 510 can be displayed on a display monitor at some magnification level with optional controls 515, such as an on-screen slide bar or other control device, to adjust the image rendering. Adjustable controls 515 could alternately be provided for adjusting values related to motion blur detection or likelihood, such as setting various sensitivity thresholds, for example.

Image 510 may contain one or more ROIs 530. For convenience, ROIs 530 are shown as rectangular in FIGS. 5A-5C, but ROIs may be of any shape or size and may overlap. An ROI need not be a single area, but may include two or more related areas that are not contiguous. The size of any individual ROI may vary based on the view, from a subsection of the image to the entire image itself. An ROI can be specially processed, such as to omit areas of direct exposure and other non-anatomical regions such as pacemakers or other devices and wires, and may also omit transition boundaries that introduce excessively high edge responses.

The ROIs with a high probability of motion may each be identified in the image in a manner that differentiates them one from another. For example, each ROI can be outlined or otherwise highlighted using a unique color, pattern, or icon. Alternately, image 510 may be displayed with no corresponding ROIs. Controls 520 may provide the ability to select and deselect the display of the ROIs and may allow cyclic display of ROIs or selection of zero to multiple ROIs displayed simultaneously. Each ROI 530 can be further represented by its probability value 532 (FIG. 5A), by an icon identifying the probability value, or may have no indication of probability value at all. If displayed, probabilities may be color-coded. For example high probabilities could be outlined in red, the next highest in orange, the next highest in yellow. Once selected, the ROI can be identified on the image via its unique identifier.

Presentation of the image data may include the ability to view an enlarged or positively magnified portion of the image, as shown by windows 550 and 560. The area of interest for magnification may be identified with a cursor 540 and displayed in window 560. Capability to roam the image, viewing a movable, magnified portion of the image can be provided. Once the image is analyzed, the user or the evaluating system itself may provide instructions for what to do with the image and probability data through an interface block 570. The directions may include such options as accepting the image for clinical or diagnostic review, rejecting the image and retaking, queueing the image for another viewer, forwarding the image and report to another location, or printing to film or paper. The display may present more than one image 510 such as shown in FIG. 5C. One use of a multi image display can be to present the user with both fully processed and unprocessed images simultaneously, for example. FIG. 5C also shows the use of a window 550 as an overlay corresponding to cursor 540 location.

The hardcopy presentation of the image can be similar to that of the softcopy presentation described with reference to FIGS. 5A through 5C. A printed copy may include one or more images as shown in FIG. 5C, a unique identification of each ROI with a high probability, and the probability associated with each ROI similar to that described for softcopy display.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, the above detailed description shows how embodiments of the present invention address problems related to chest radiograph images as an illustrative example. However, this method could be more broadly applied, using a similar sequence of processes, for images other than chest radiographs, including mammography images and other types of x-ray diagnostic images or other diagnostic images.

Various types of methods for image assessment and display or reporting could be used as alternatives to those described with reference to FIGS. 5A-5C.

Thus, what is provided is an apparatus and method for automatically detecting and reporting motion blur in diagnostic images.

| | |
|---|---|
| 21 | lung region |
| 100 | Image acquisition step |
| 110 | Orientation step |
| 120 | Region location step |
| 130 | Computing motion step |
| 140 | Identification step |
| 150 | Reporting step |
| 201 | region of interest |
| 202 | region of interest |
| 203 | region of interest |
| 204 | region of interest |
| 300 | Obtain radiograph step |
| 310 | Edge generation step |
| 315 | ROIs |
| 320 | Segmentation step |
| 330 | Histogram step |
| 340 | Computation step |
| 500 | Data block |
| 510 | Image |
| 515 | Control |
| 520 | Control |
| 530 | ROI |
| 532 | Probability value |
| 540 | Cursor |
| 550, 560 | Window |
| 570 | Interface block |

The invention claimed is:

1. A method for detecting one or more motion effects in a diagnostic image, executed using a processor, comprising:
   obtaining image data of the diagnostic image;
   identifying at least one region of interest in the diagnostic image by applying a template with one or more predefined regions of interest to the image;
   calculating the probability of motion blur within the at least one region of interest according to a motion-sensitive feature of the at least one region of interest; and
   reporting the calculated probability for motion blur within the at least one region of interest.

2. The method of claim 1 further comprising arranging the image data according to a predetermined image orientation.

3. The method of claim 1 wherein the diagnostic image is a digital radiographic image.

4. The method of claim 1 wherein the motion-sensitive feature of the at least one region of interest is an edge feature.

5. The method of claim 1 wherein calculating the probability of motion blur comprises:
   forming, from data within the region of interest, at least one edge image with respect to a predetermined direction;
   obtaining a histogram of edge image values for the at least one edge image;
   identifying one or more motion-sensitive features according to histogram data; and
   evaluating the one or more identified motion-sensitive features to obtain a probability value for motion blur.

6. The method of claim 5 wherein one or more motion sensitive features are computed based on the mean local variation of edge images.

7. The method of claim 5 wherein one or more motion sensitive features are computed based on statistical measures of the variation of edge values.

8. The method of claim 5 wherein one or more motion sensitive features are computed based on an estimate of edge strength within a predetermined range in edge histograms.

9. The method of claim 5 wherein evaluating the one or more calculated image features to obtain a probability value for motion blur further comprises:
   applying a trained classifier to assess the motion sensitive features; and
   generating a probability value of motion blur according to results from the trained classifier.

10. The method of claim 1 wherein identifying at least one region of interest comprises:
    assigning at least one point in the image as a seed;
    evaluating statistical values of the corresponding features adjacent to the seed;
    merging adjacent pixels satisfying preset requirements with the seed to form the region of interest; and
    repeating the steps of evaluating and merging until a predetermined requirement is met.

11. The method of claim 1 wherein reporting at least one region of interest that exhibits motion blur comprises reporting a global probability of motion by combining probabilities of more than one region of interest in the diagnostic image.

12. The method of claim 1 wherein reporting calculated probability for motion blur within the at least one region of interest comprises reporting according to an operator-adjusted sensitivity value.

13. The method of claim 1 wherein reporting the calculated probability comprises displaying an image on a display monitor.

14. The method of claim 13 further comprising highlighting the at least one region of interest on the display monitor.

15. The method of claim 13 further comprising displaying a corresponding probability value for motion blur for the at least one region of interest.

16. The method of claim 13 wherein the displayed image is a first version of the image and further comprising displaying a second version of the image on the display monitor, wherein the first and second versions are processed differently.

17. The method of claim 13 further comprising providing operator controls to adjust image rendering.

18. The method of claim 13 further comprising providing operator controls to adjust magnification and roam.

19. The method of claim 13 wherein an outline color indicates a relative range of probability for motion blur.

20. The method of claim 13 further comprising providing an icon that indicates a probability value for motion blur in the at least one region of interest that displays.

21. The method of claim 1 further comprising directing the diagnostic image to another viewer.

22. The method of claim 1 further comprising providing an instruction to retake the image.

23. The method of claim 1 wherein reporting the calculated probability comprises generating a hardcopy print.

24. The method of claim 1 wherein reporting the calculated probability comprises recording a calculated value in a database.

25. The method of claim 24 wherein reporting the calculated probability further comprises storing coordinates of the region of interest in the database.

26. A method for detecting one or more motion effects in a diagnostic image, executed using a processor, comprising:
obtaining image data for the diagnostic image;
arranging the image data according to a predetermined image orientation;
identifying at least one region of interest in the diagnostic image by applying a template with one or more predefined regions of interest to the image;
calculating the probability of motion blur within the at least one region of interest according to one or more edge features within the at least one region of interest; and
reporting the calculated probability for motion blur within the at least one region of interest.

* * * * *